Feb. 9, 1965 F. G. J. GRISE 3,168,994
CART HAVING SELF WINDING REEL
Filed March 7, 1963 2 Sheets-Sheet 1
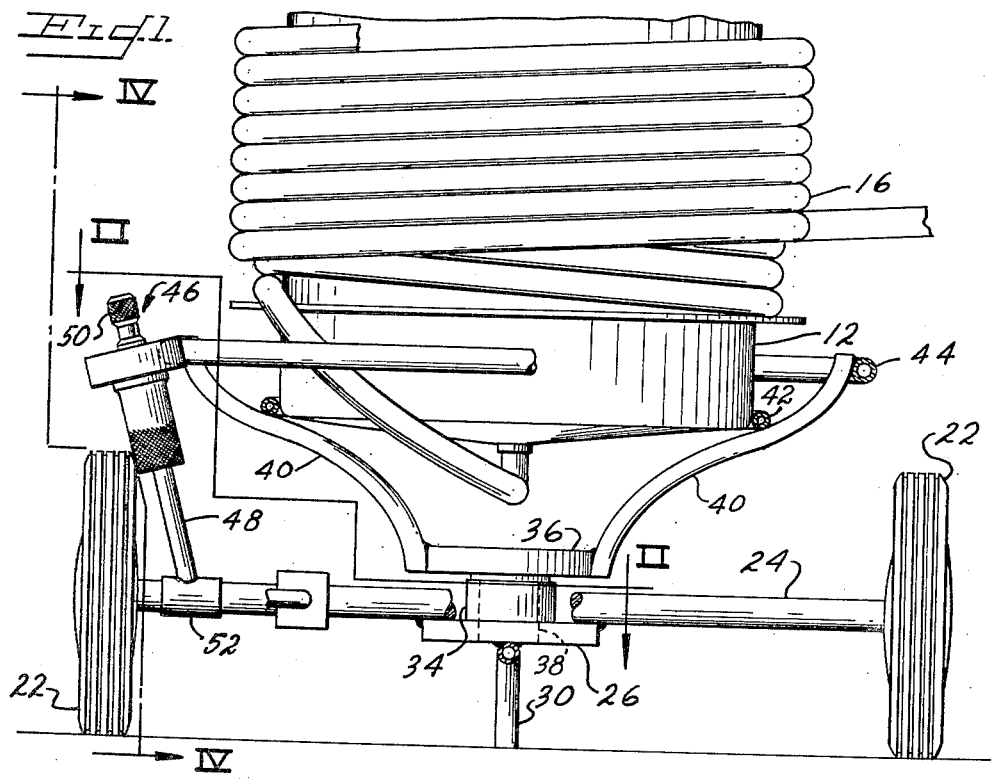
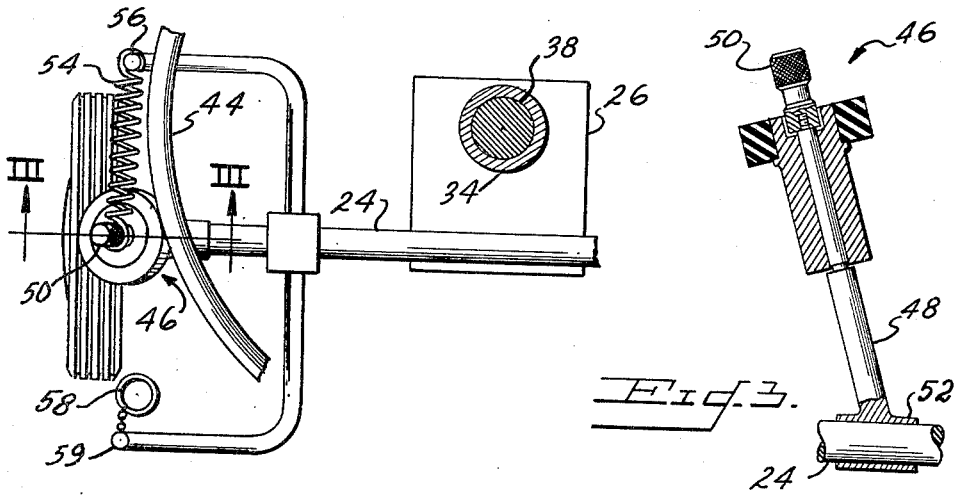
INVENTOR
Frederick G. J. Grise
BY Chapin & Neal
ATTORNEYS INVENTOR
Frederick G. J. Grise
BY Chapin + Neal
ATTORNEYS United States Patent Office 3,168,994
Patented Feb. 9, 1965

3,168,994
CART HAVING SELF WINDING REEL
Frederick G. J. Grise, Webb Road, New Braintree, Mass.
Filed Mar. 7, 1963, Ser. No. 263,604
5 Claims. (Cl. 242—86.6)

The present invention relates to improvements in carts having a reel on which hose or the like is wound, and more particularly to improved means for winding hose on the reel of a milk collecting cart.

The object of the invention is to provide a simple and economical means for automatically winding a hose or the like on a reel which is rotatably mounted on a cart in response to movement of the cart.

While it will be appreciated that the present invention has general utility in its broader aspects, it was motivated by the special needs of milk producers. It is standard practice to transfer milk to a cooling vat immediately after the milking operation. To facilitate this transfer in an economical manner, a system has been devised wherein a cart is moved progressively down a row of stalls and milk from individual cows dumped into a tank on the cart. The milk is then drawn through a hose connected to the tank to a unit at a remote location which discharges it into the cooling vat.

According to present practice, this tank is rotatably mounted on the cart so that it will also serve as a reel for the hose. However, winding the hose on the tank still involved considerable time and trouble. The problem was of particular importance because of the standards of cleanliness which are established for most dairy farmers and which require that the hose be transparent so that it can be inspected at all times. To enable this inspection it is desirable, if not essential, that the exterior of the hose be clean and preferably free of scratches or other markings. When employing the described system, it is therefore the preferred practice to hang the hose on straps as it is extended to the most remote stall so that it is either suspended or wound on the reel at all times without contacting the floor.

The present invention provides a drive transmission between the tank and one of the wheels of the cart which is selectively brought into an operative position to rotate the tank and automatically wind the hose thereon as the cart is propelled toward the cooling vat. The drive transmission is extremely simple, comprising a rotary element which frictionally engages both the wheel and the tank. This simplicity and consequent economy is of great importance inasmuch as cost of the described milk collecting must be maintained at a minimum in order that it be competitive.

The above and other related objects and features of the invention will be apparent from a reading of the following description of the disclosure found in the accompanying drawings and the novelty thereof pointed out in the appended claims.

In the drawings:

FIG. 1 is an end view, with portions broken away, of a milk collecting cart embodying the present invention;

FIGURE 2 is a section taken on line II—II in FIG. 1;

FIG. 3 is a section, on an enlarged scale, taken on line III—III in FIG. 2;

Figure 4:
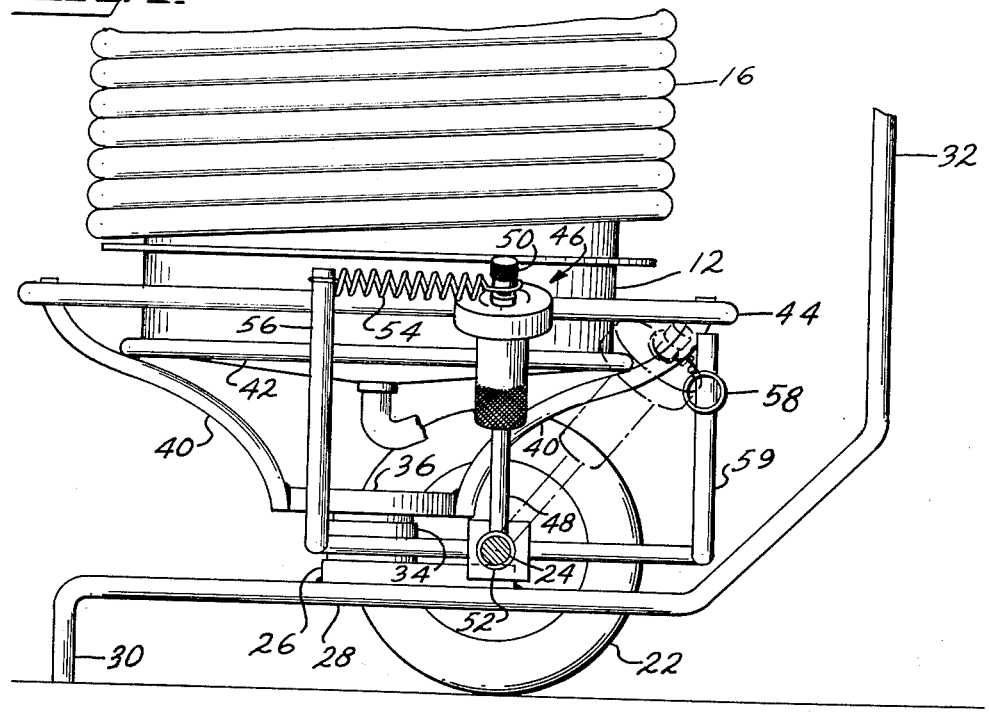
FIG. 4 is a section take on line IV—IV in FIG. 1.
Figure 5:
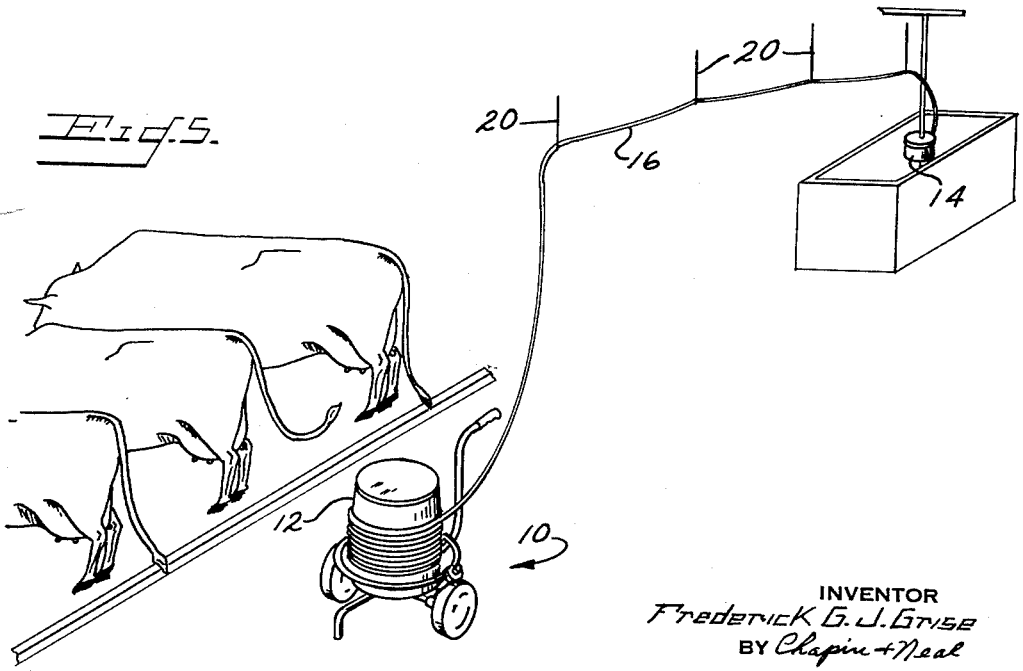
FIG. 5 is a perspective view illustrating this cart in use.

Referring first to FIG. 5, the cart of the present invention, indicated at 10, is propelled along a row of stalls where cows are being milked. The milk collected from each cow is dumped into a tank 12 rotatably mounted on the cart about a vertical axis. The milk is drawn to a collector unit 14 through a hose 16 which is connected to the bottom of the tank 12 and coiled therearound. From the collector unit 14, the milk is discharged into a cooling vat 18 for processing in the usual manner. The mode of operation of the collector unit 14 is known and forms no part of the present invention.

The hose 16 is suspended on hangers 20 as it is unwound from the tank 12 as the cart 10 is propelled to the most remote stall, thereby minimizing the possibility of the hose becoming scratched or dirty. This enables a visual inspection of the hose for cleanliness. The hose is usually a transparent plastic so that both the interior and exterior can be inspected. When the cart is propelled back towards the vat 18 for storage after use, the tank 12 is automatically rotated by transmission means now to be described to wind the hose 16 thereon.

Referring now to FIGS. 1-4, the cart 10 comprises a pair of wheels 22 which are rotatably mounted on an axle 24. The axle 24 is secured as by welding to a plate 26 which rests on and is secured to a rod 28. The rod 28 has a downward end 30 which, in combination with the wheels 22, provides a three-point support for the cart when it is at rest. The other end of the rod 28 is bent upwardly to provide a handle 32 for use in propelling the cart.

A boss 34 is secured to the plate 26 and provides a journal for rotatably mounting the tank 12. The tank 12 is mounted on a frame which comprises a plate 36 having a shouldered stud 38 which rests on and is rotatably received within the boss 34. A plurality of tubular arms 40 project from the plate 36 and have a tubular ring 42 secured thereto; the tank 12 is in turn secured to the ring 42. The arms 40 project above and outward of the tank 12 and have a rim 44 secured to their upper ends. The rim 44 is concentric of the tank 12.

As can be seen from FIG. 1, the hose 16 is attached to the lower end of the tank 12 and then coiled therearound.

The drive transmission for rotating the tank 12 very simply comprises a rotatable member 46 of circular cross section which frictionally engages one of the wheels 22 and the rim 44. It is preferred that one of each of the two engaging pairs of surfaces be rubber or like material and the other be a relatively hard metal. Thus the lower end of drive member 46 is formed of steel and knurled to obtain a good frictional engagement with the rubber tire of wheel 22. The upper end of the member 46 is covered with rubber and engages the steel rim 44.

The member 46 is rotatably mounted on an arm 48 an held thereon by a nut 50 threaded onto a projection at the upper end of this arm. The lower end of the arm is secured to a collar 52 which is journaled on the axle 24. The drive member 46 is thus pivotal about the axle 24 and is held in engagement with the wheel 22 and rim 44 by a tension spring 54 which extends from the stud 50 to one end of a bracket arm 56. The bracket arm 56 is secured to the axle 24 and has a ring 58 tethered to its other end 59 which is disposed on the opposite side of the axle. The ring 58 provides means for maintaining the drive member 46 in an inoperative position. The drive member, when desired, may be pivoted to a position in which the ring may be slipped over the end of the nut 50 and thus be maintained in the disengaged, inoperative position indicated by the phantom shown in FIG. 4.

The diameters of member 46 are selected so that they are tightly wedged in the bite which exists between the wheel 22 and rim 44 as will be apparent from FIGS. 1 and 2. These diameters are also preferably selected so that the tank 12 is rotated at a rate slightly faster than that required for winding the hose thereon. Thus the hose is maintained taut as there is a slight slippage in the drive transmission. Preferably this slippage occurs between the upper end of the member 46 and the rim 44 which is purposely smooth. Wear on the tire is thus minimized.

The selection of diameters is further controlled by the relative diameters of the tank and the surface thereof (viz. rim 44) with which driving engagement is made. The rim 44 being larger than the tank 12, requires the upper end of the member 46 to have a larger diameter than its lower end which engages the wheel 22.

It will be apparent to those skilled in the art that various modifications and different forms of fabrication can be made within the scope of the present teachings. The disclosure is thus illustrative and the following claims denote the limitations of the invention.

Having thus described the invention, what is claimed as novel and desired to be secured by Letters Patent of the United States is:

1. A cart having a vertically disposed reel rotatable about a vertical axis, said reel having secured thereto a circular rim of greater diameter than said reel, a pair of supporting wheels which rotate as the cart is moved, a rotatable driving member frictionally engaging the rim and one of said wheels to rotate the reel in response to movement of the cart, and an arm pivotally mounted about the axis of said one wheel and disposed between said wheels adjacent said one wheel, said driving member being rotatably mounted on said arm about an axis angled between said one wheel and said rim, said driving member having a portion of a given diameter engaging said rim and a second portion of lesser diameter engaging the side of said wheel.

2. A cart as in claim 1 wherein spring means are provided for yieldingly holding said driving member in engagement with said one wheel and said rim, and further wherein means are provided for releasably holding said driving member in a pivoted inoperative position.

3. A cart as in claim 1 wherein the said one wheel has a rubber tire and the portion of the driving member in engagement therewith is formed of a roughened hard material and the rim is of smooth hard material and the portion of the driving member and engagement therewith is formed of rubber.

4. A manually propelled cart for the collection of milk, said cart having a tank rotatably mounted thereon about a vertical axis, a hose connected to said tank and wound therearound, said tank having a generally cylindrical driving surface disposed adjacent the lower end thereof, a pair of wheels which support the cart and rotate as the cart is propelled, at least one of said wheels underlying in part the vertical outline of said driving surface, an axle on which said wheels are mounted, an arm mounted on said axle and pivotable about the axis thereof, said arm being angled between said one wheel and said driving surface, a driving member rotatably mounted on said arm, one portion of said driving member having a generally cylindrical surface for engagement with the side surface of said one wheel and another portion also having a generally cylindrical surface for engagement with the driving surface of said tank, spring means resiliently holding said driving member in frictional engagement with said wheel and the driving surface of said tank, and means for releasably holding said arm in pivoted position wherein the driving member is spaced from the driving surface of said tank and is therefore inoperative.

5. A manually propelled cart for the collection of milk, said cart having a tank rotatably mounted thereon about a vertical axis, a hose connected to said tank and wound therearound, said tank having a rim of larger diameter connected thereto and disposed adjacent the lower end thereof, a pair of wheels which support said cart and rotate as the cart is propelled, at least one of said wheels having a rubber tire and underlying at least in part the vertical outline of said rim, an axle on which said wheels are mounted, an arm mounted on said axle adjacent and interiorly of said one wheel, said arm being pivotal about the axis of said axle, said arm being angle outwardly with its axis extending between the rim and said one wheel, a driving member rotatably mounted on said arm about the axis thereof, the lower portion of said driving member having a knurled cylindrical steel surface for engagement with the side surface of said one wheel, the upper portion of said driving member having a cylindrical rubber surface for engagement with said rim, the diameter of said upper portion being sufficiently greater than that of the lower portion to rotate the tank at a slightly greater rate than necessary to wind the hose thereabout, spring means resiliently holding said driving member in frictional engagement with said wheel and rim and means for releasably holding said arm in a pivoted position wherein the driving member is spaced from said rim and therefore inoperative.

References Cited in the file of this patent
UNITED STATES PATENTS

| | | |
|---|---|---|
| 636,004 | Milbrath | Oct. 31, 1899 |
| 754,006 | Packer | Mar. 8, 1904 |
| 1,185,301 | Frank | May 30, 1916 |
| 1,396,109 | Grimsley | Nov. 8, 1921 |
| 1,458,861 | Springowski | June 12, 1923 |
| 1,463,696 | Hanson | July 31, 1923 |
| 1,545,546 | Brittin | July 14, 1925 |
| 1,918,768 | Markkula | July 18, 1933 |
| 3,053,225 | Babson | Sept. 11, 1962 |